March 25, 1930.  J. N. BAKER  1,751,462
BRUSH HOLDER FOR ELECTRIC TOOLS
Filed March 13, 1928  2 Sheets-Sheet 1
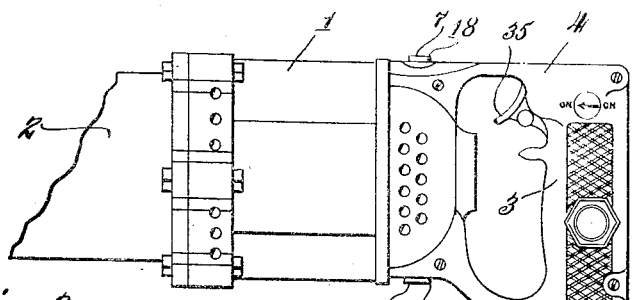
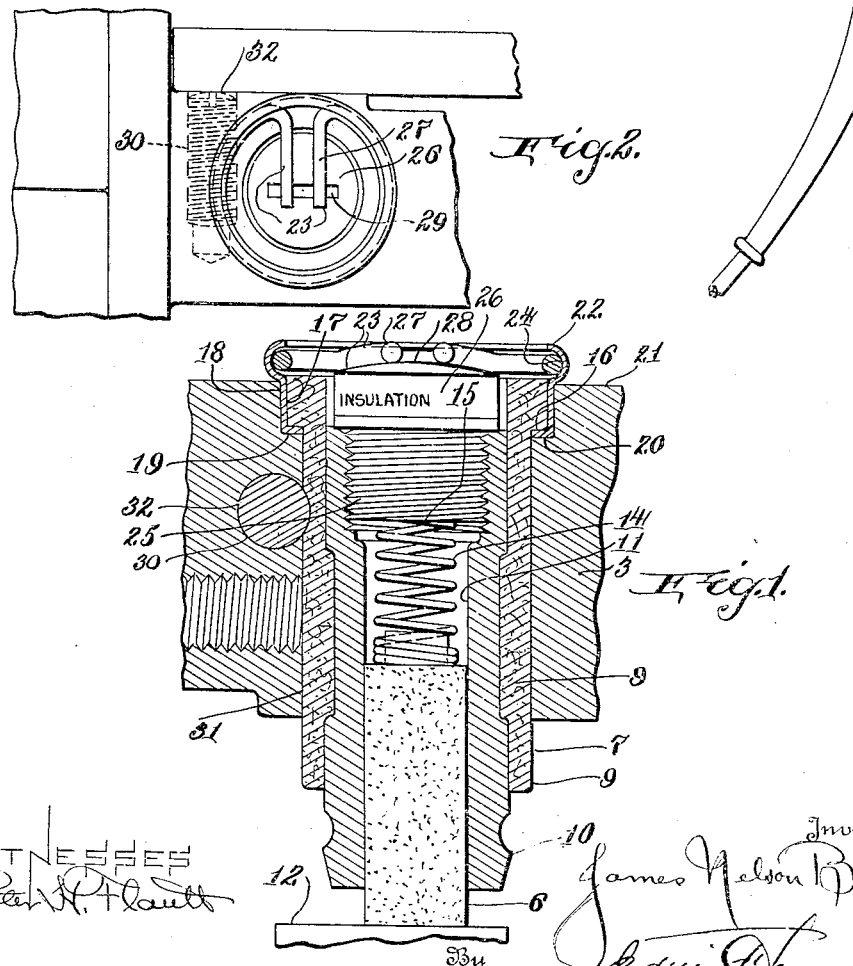

March 25, 1930.  J. N. BAKER  1,751,462
BRUSH HOLDER FOR ELECTRIC TOOLS
Filed March 13, 1928  2 Sheets-Sheet 2

Inventor
James Nelson Baker
By Edwin Hammels
Attorney

Patented Mar. 25, 1930

1,751,462

UNITED STATES PATENT OFFICE

JAMES NELSON BAKER, OF BALTIMORE COUNTY, MARYLAND, ASSIGNOR TO THE BLACK AND DECKER MANUFACTURING COMPANY, OF TOWSON HEIGHTS, MARYLAND, A CORPORATION OF MARYLAND

BRUSH HOLDER FOR ELECTRIC TOOLS

Application filed March 13, 1928. Serial No. 261,210.

In the operation of portable electric tools a considerable difficulty is encountered in maintaining the contact at the motor brushes. The vibration of the tool causes the brush holders to become loosened and displaced, interfering with the contact of the brushes with the commutator and in some instances the brush holders are so loosened by the vibration as to permit them to turn or even to fall out of their position in the tool.

It also happens not infrequently that the brush holder caps work loose and become unscrewed, releasing the brush spring so that it flies out and is lost.

Because of these difficulties the tools have been not infrequently laid aside for repair and adjustment with a consequent loss of the employee's time, either in repairing the tool, in using some less efficient appliance or in waiting for the tool to be repaired.

The present invention comprises and relates to improved features whereby these and other difficulties are overcome and avoided and increased efficiency is attained. The improvements relate particularly to brush holders of the cartridge type and, as described, in connection with a portable electric tool, but they are, however, capable of more general application.

In the accompanying drawings I have illustrated a portable electric tool to which the features of my invention in the preferred form have been applied.

In the drawings:

Figure 1 is an enlarged view in the form of a section taken in a plane of the axis of a brush and brush holder and in a radial plane of the motor.

Figure 2 is a plan looking at the brush holder, as shown in Figure 1, from above.

Figure 3 is an elevation showing the entire tool on a small scale, the gear case being broken away.

Figure 4:
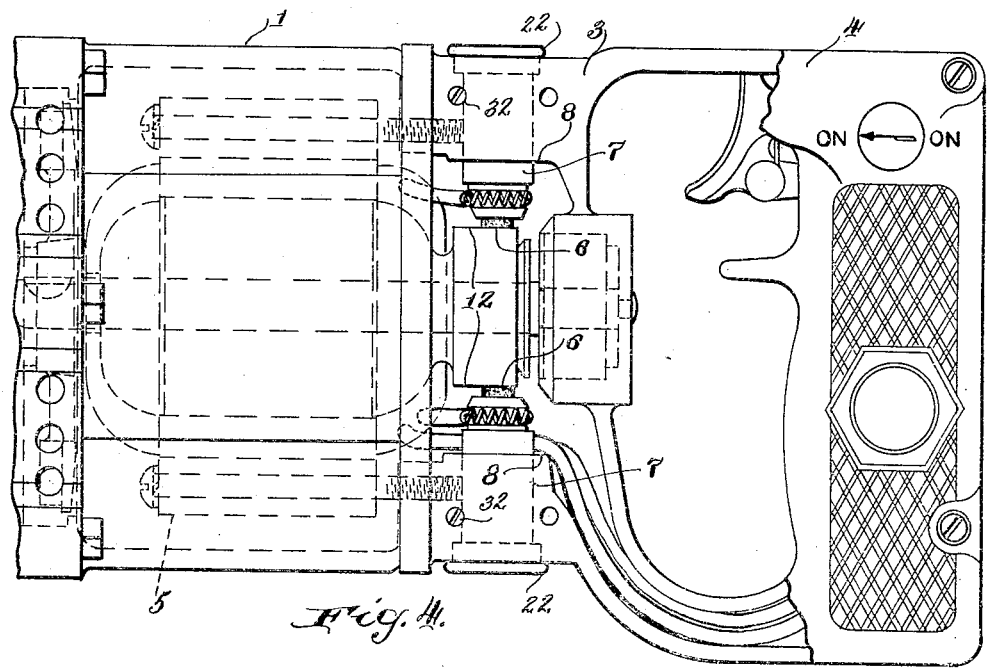
Figure 4 is a corresponding elevation showing the motor, motor casing and hand grip, i. e., the portion of the tool at the right in Figure 1, on an enlarged scale. The grip and brush cover is removed.
Figure 5:
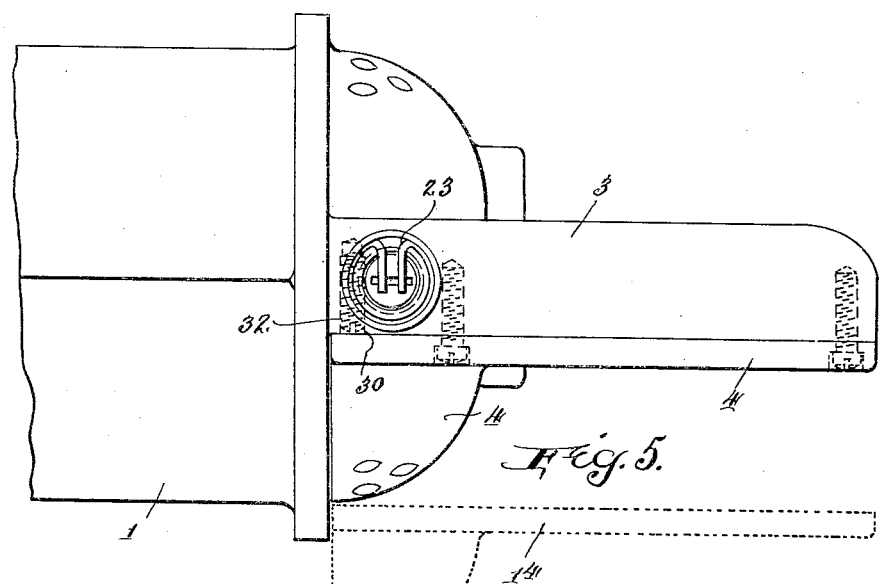
Figure 5 is a plan, i. e., looking downwardly from above the tool, as shown in Figure 4, and showing only the rear portion of the same as illustrated in Figure 4.

Referring to the drawings by numerals, each of which is used to indicate the same or similar parts in the different figures, the machine in the preferred form, as shown, comprises a motor field casing or housing 1, gear or tool casing 2 and grip 3 having a brush and switch cover 4, the grip being preferably hollow and containing the switch parts, not shown, which switch parts are accessible through the open side of the grip which is closed by the cover 4.

The invention relates to the brush holder and cap and to the manner of mounting, holding and supporting the same. In the form of the invention shown, an electric motor 5 is mounted in the casing 1. the same being indicated in dotted lines in Figure 4, and this motor is provided with a commutator 12 with oppositely placed brushes 6, 6, mounted in suitable brush holders 7, 7, shown as of the cartridge type. In the preferred form shown the commutator is mounted in a chamber 8 in the grip casting and the brushes 6 are of rectangular cross section, but they may be of any preferred construction. The brushes are mounted to slide longitudinally in the brush holders 7, each of which, in the form of the invention shown, consists of an outer sleeve 9 which may be of fibre or other insulating material and an inner sleeve or lining 10, in a way 11 in which sleeve the brush slides, the brush being held normally pressed forwardly against the commutator 12 by means of a coil spring 14, the spring bearing at one end against the brush 6 and at the other end against a cap 15 shown in the form of a screw or plug.

The outer sleeve 9 of each brush holder, referring particularly to the position of the one shown in Figure 1, is formed of an enlarged diameter at the top and provided with a downwardly disposed circumferential shoulder 16 at the lower edge of the enlarged portion 17, the term downward having reference to the illustration, Figure 1.

The enlarged portion 17 is enclosed within a pressed steel collar 18 and this collar is provided with a flanged edge portion 19 which projects inwardly beneath the shoulder 16, being held between this shoulder and a corresponding shoulder 20 formed in the grip casting 3.

In assembling the tool the collar 18 is placed about the brush holder sleeve 9 and as the latter is forced into place the collar 18 is likewise pressed into position and locked by the gripping of the edge flange 19 between the shoulders 16 and 20, already described. This collar projects above the outer surface 21 of the grip member 3 and is formed as to its projecting edge portion 22 into an inwardly disposed circumferential groove 24.

The cap 15 is formed with a threaded portion 25 which engages a correspondingly threaded portion of the brush holder, said threads being referred to hereinafter as interengaging means holding the cap in position above the threaded portion the cap is formed with a head portion 26 like the head of a screw, the cap being, in fact, in the form of a short and proportionately thick screw, the head of which is preferably of insulating material provided with a central slot 29 by which the cap may be engaged with a suitable tool to remove the cap.

In the absence of the feature of the invention being described, the cap has been loosened by the vibration of the tool and in instances which are not infrequent the cap has worked entirely free of the threaded opening and both the cap and spring have been projected outwardly by the sudden expansion or snap of the spring.

In accordance with the present invention a spring ring 23 is seated in the circumferential groove 24. In assembling, the loop or ring proper, being normally of slightly larger diameter than the groove, is compressed and inserted within the upper edge of the collar 18 and then permitted to expand into the groove. In the form of the invention shown, the ring is what may be termed a split ring, in that instead of being a continuous ring, it is formed with two spaced ends 27 which are turned inwardly, being shown parallel to each other and spaced apart projecting toward the center of the ring.

The important feature resides in the fact that the spring member or spring ring 23 is provided with means for engaging and holding the cap 15 in position, the projecting ends 27 serving this purpose in the preferred form of the invention shown.

In the form of the invention shown, the top surface 28 of the head 26 of the cap or set screw 15 is slightly convex, and the inwardly projecting ends 27 may be sprung downwardly, i. e., toward the screw 25, applying a certain amount of tension to the screw and eliminating the tendency to loosen it by the vibration of the machine.

The motor is controlled by trigger switch 35.

After the brush 6 and the brush spring 14 are inserted in the holder, the cap or set screw 15 is inserted and tightened by turning it down in place applying the desired tension to the brush spring 14. The spring ring 15 is then snapped into the groove, applying the necessary tension or pressure to the screw to eliminate the effect of vibration, preventing the brush holder cap or set screw 15 from backing out. The spring ring 23 can be readily removed by pinching together the two ends 27. When thus collapsed it can easily be withdrawn from the groove.

The invention further relates to the provision of means for securing a cylindrical brush holder or brush holder of the cartridge type. In accordance with the present existing practice, such brush holders are held in position in each instance by means of a set screw, which is so placed that when tightened the point of the screw bears directly, i. e., inwardly and radially, against the outside of the sleeve, i. e., the outer sleeve of the brush holder. In cases where a considerable amount of vibration exists, this type of screw clamp is not effective as it has a tendency to loosen, permitting the brush holder to turn, throwing the brush out of adjustment, and in some instances the brush holder even falls out.

In accordance with the improved construction, a tapped hole 30 is bored in the grip casting or at a convenient point in the casing. In the present instance, the brushes are mounted in the grip casting 3 and the hole 30 referred to is bored therein. The tapped hole 30 is preferably tangent, or nearly so, to the bore 31, but spaced slightly outwardly. It intersects to a slight degree, preferably as to the thread groove only, the bore 31 in the grip casting 3, in which the outer sleeve 9 of the brush holder is seated.

Under these circumstances, when the brush holder clamping screw 32 is inserted in the hole 30 and duly tightened, the threads of the screw bite into the sleeve 9 and hold it rigidly in position, particularly the brush holder is prevented from turning around in its seat and from backing out.

It will be further noticed from examination of Figures 2 and 4, that the head of the screw 32 underlies the grip and brush cover 4 so that the screw 32 cannot come out while the tool is assembled and the cover is in position, and as the screw hole 30 is not tapped through the casting, and, as shown, does not extend through the casting, the screw cannot work through to the side opposite the cover.

It will be easily apparent from the description that when the brush holder is inserted in the bore 31 and held by the bite of the threads of the screw 32, the screw in turn being held by the cover 4 from backing out, and the end of the hole opposite the cover being closed so that the screw cannot work through to that side, and the brush and spring being duly adjusted and held by the brush cap 15, which is, in turn, located by the spring ring 23, the adjustment of the brush or brushes becomes permanent and is subjected to change only by wear of the brushes or commutator.

I have thus described specifically and in detail a single preferred embodiment of my invention in order that the nature and operation and manner of applying and using the same may be clearly understood, however, the specific terms herein are used descriptively rather than in a limiting sense, the scope of the invention being defined in the claims.

What I claim as new and desire to secure by Letters Patent is:

1. The combination in a portable electric tool of an electric motor, brushes, brush holders of circular cross section, a casing and a set screw seated in the casing substantially tangent to the brush holder so that the threads of the set screw bite into the side of the brush holder casing.

2. The combination in a portable electric tool of an electric motor, a brush holder of circular cross section and a set screw substantially tangent to the brush holder, so that the threads of the set screw bite into the brush holder casing, a cover which overlies the screw head and means at the opposite end of the screw preventing displacement of the screw in the direction opposite to the cover.

3. In a portable electric tool an electric motor, a brush, a brush holder of the cartridge type, a brush spring, a cap holding the brush and brush spring, inter-engaging means for normally holding the cap in position and a spring bearing on the cap and checking the tendency to vibration of the same to prevent disengagement of the inter-engaging means.

4. In an electric tool, a motor, brush and a brush holder of the cartridge type, a brush spring and screw cap holding the brush and brush spring, a collar enclosing the outer end of the brush holder, the collar being formed with an internal peripheral groove, a spring ring in the groove having internal spring ends bearing on the screw cap.

5. In an electric tool, a motor and motor casing, a grip casting secured to the motor casing and serving as a brush support, the grip having a removable member secured thereto, which removable member covers the brushes and commutator, brushes, and brush holders of the cartridge type seated in the handle casting, a screw for each brush holder seated in the brush support substantially tangent to the brush holder, the threads of the screw biting into the brush holder to grip the same and hold it against rotation, the screws underlying the said removable member.

6. In an electric tool, a motor and motor casing, a grip casting secured to the motor casing and serving as a brush support, the handle being hollow and having a cover for said hollow portion, which cover also covers the brushes and commutator, brushes and brush holders of the cartridge type, a screw for each brush holder substantially tangent thereto, the threads of the screw biting into the brush holder to grip the same and hold it against rotation, the screw underlying the said cover, and means at the opposite end of the screw to prevent displacement of the screw in the direction opposite to the cover, a collar secured between the brush holder and the surrounding portion of the grip casting, a brush cap seated in the holder, a spring ring having an inwardly projecting portion bearing on the cap, the collar providing a seat for the ring.

7. In a portable electric tool an electric motor, a brush mounted to slide toward and from the commutator, a coil spring bearing against the brush in the direction of motion to hold the brush in contact with the commutator, a screw cap for compressing and holding the spring in position and a removable spring clip and means supporting the same in contact with the screw cap to prevent loosening of the same by vibration.

Signed by me at Towson, Maryland, this 9th day of March, 1928.

JAMES NELSON BAKER.